C. W. TAYLOR.
BRAKE MECHANISM FOR DIFFERENTIALS.
APPLICATION FILED MAY 6, 1918.

1,324,855.

Patented Dec. 16, 1919.
3 SHEETS—SHEET 1.

Witnesses
Milton Lenoir

Inventor
Clarence W Taylor

C. W. TAYLOR.
BRAKE MECHANISM FOR DIFFERENTIALS.
APPLICATION FILED MAY 6, 1918.
1,324,855.
Patented Dec. 16, 1919.
3 SHEETS—SHEET 2.
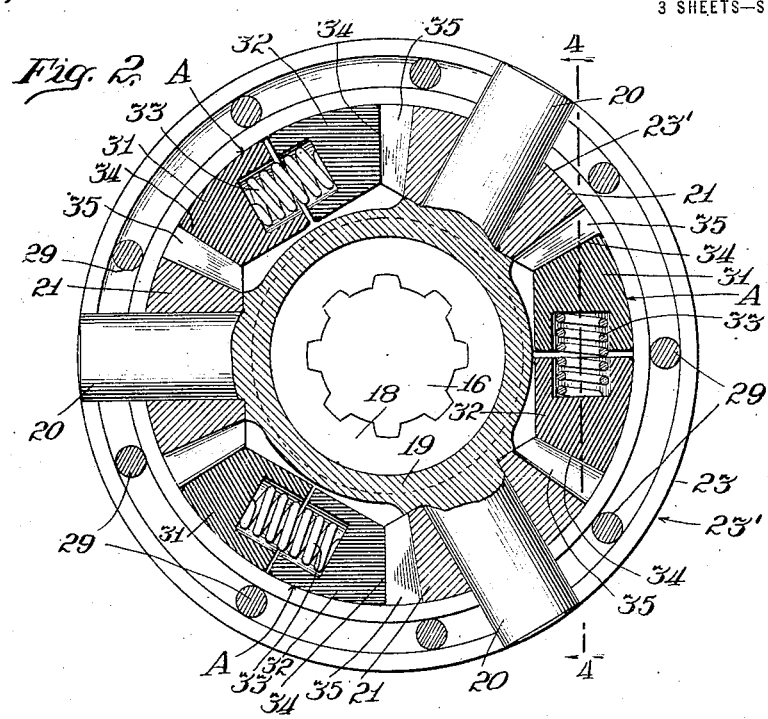
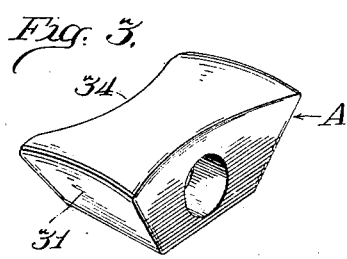
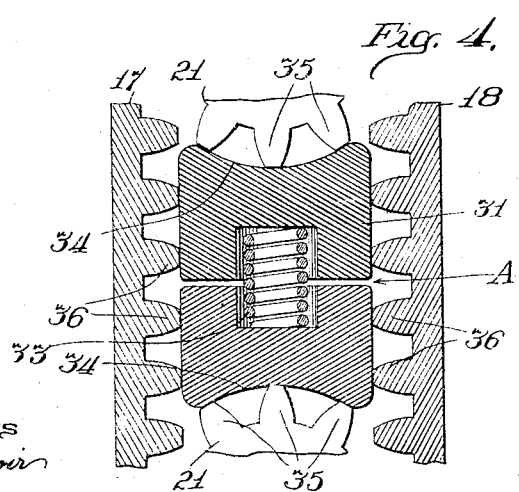
Witnesses
Milton Lenoir
Inventor
Clarence W Taylor C. W. TAYLOR.
BRAKE MECHANISM FOR DIFFERENTIALS.
APPLICATION FILED MAY 6, 1918.
1,324,855.
Patented Dec. 16, 1919.
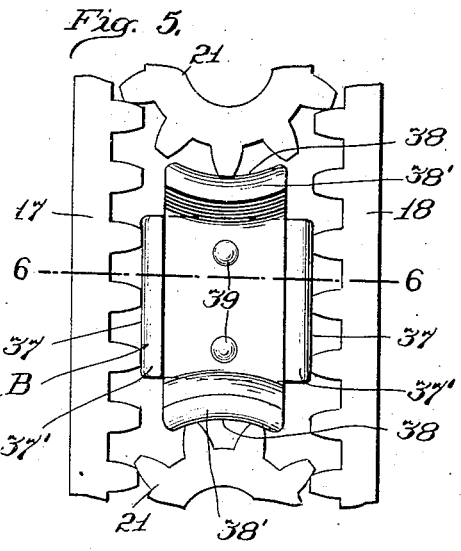
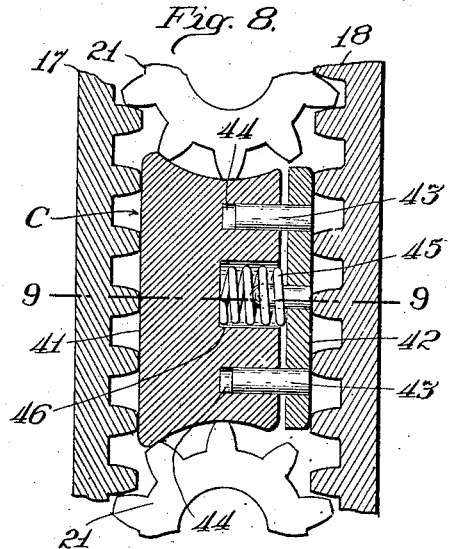
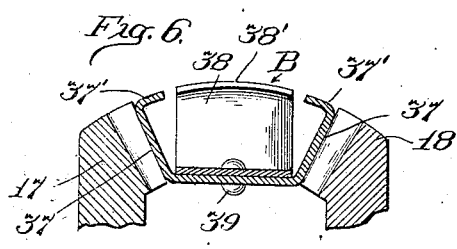
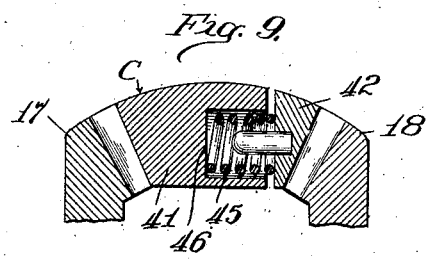
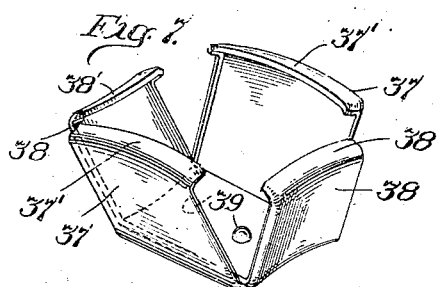
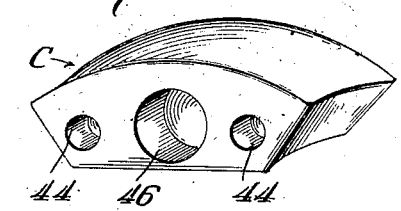
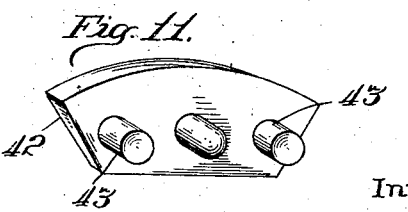
Witnesses
Milton Lenoir
Inventor
Clarence W. Taylor

UNITED STATES PATENT OFFICE.

CLARENCE W. TAYLOR, OF CHICAGO, ILLINOIS, ASSIGNOR TO ONLAKE COMPANY, OF CHICAGO, ILLINOIS, A CORPORATION OF ILLINOIS.

BRAKE MECHANISM FOR DIFFERENTIALS.

1,324,855.   Specification of Letters Patent.   Patented Dec. 16, 1919.

Application filed May 6, 1918. Serial No. 232,694.

*To all whom it may concern:*

Be it known that I, CLARENCE W. TAYLOR, a citizen of the United States of America, residing at Chicago, in the county of Cook and State of Illinois, have invented certain new and useful Improvements in Brake Mechanism for Differentials, of which the following is a specification.

My invention relates to improvements in brake devices for differentials, particularly of the bevel gear type; and the objects of my improvement are;

First, to provide a divided shaft construction which operates substantially as a solid shaft at all times excepting when the conditions render necessary some degree differentiation;

Second, the provision of devices incorporated with a differential in an automobile, truck, or the like to give a solid axle effect in operation and permit ample compensation for the difference in travel of either road wheel; and Third, to produce differential transmission devices for self-propelled vehicles to prevent what is termed "spinning" of either road wheel independently of the other road wheel.

With the above and other objects in view, my invention consists in the novel features and in the novel combination and arrangement of parts, illustrated in the accompanying drawings forming a part of this specification, and particularly pointed out in the claims hereunto appended; it being understood that changes, variations and modifications in the details of the invention within the scope of the claims may be resorted to without departing from the spirit or sacrificing any of the advantages thereof.

By showing and specifically describing one embodiment of my invention I do not intend to restrict the range of equivalents not made necessary by the prior state of this art.

In the drawings,

Fig. 2 is a cross section on line 2—2 on Fig. 1.

Fig. 3 is a perspective view of one part of the brake-element.

Fig. 4 is a section on line 4—4 on Fig. 2.

Fig. 5 is a plan view of gears and pinions with a modified form of brake-element.

Fig. 6 is a cross sectional view on line 6—6 on Fig. 5.

Fig. 7 is a perspective view of a modified form of brake-element B, detached.

Fig. 8 is a plan of gears and pinions with a modified form C of the brake-element.

Fig. 9 is a section on line 9—9 on Fig. 8.

Figs. 10 and 11 are perspective views of parts of the brake-element C.

Similar numerals refer to like parts throughout the several views.

Figure 1:
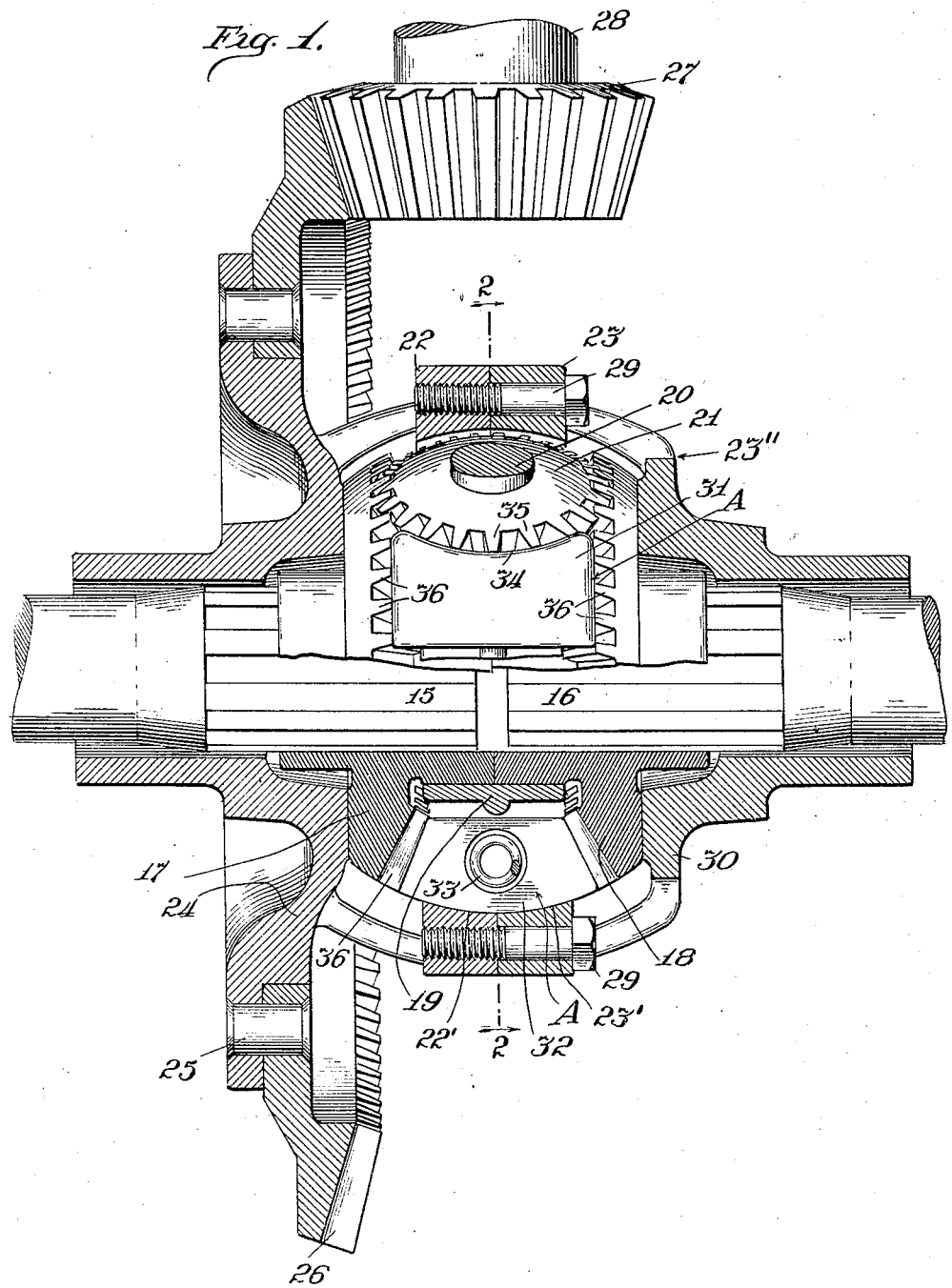
Figure 1 is a horizontal section of the mid portion of the rear axle of an automobile at the adjacent ends of the divided shaft with a brake element or device disposed between the gears, partly in elevation and partly in section.

In accordance with my invention, I incorporate with a differential what is termed a brake-element formed to occupy space between the inner faces of the gears on the divided shaft and mounted between two pinions which are loosely mounted on trunnions of the differential spider and in frictional contact with the teeth of the gears or the teeth of the pinions or in frictional relation to the teeth of both the gears and the pinions as may be preferred, to sufficiently oppose relative rotative movement of said gears or pinions or both movable parts to cause the divided shaft to operate substantially as a solid axle and yet permit ample compensation for the difference in travel of either road wheel when the forces acting at the periphery of the road wheels are greater than the frictional resistance of said brake-element between the gears, pinions or both of them.

Referring to the drawings, the adjacent ends 15 and 16 of the usual divided shaft are formed and fixed in a common manner to the draft members gears 17, 18 between which power is transmitted. The differential spider 19 is termed a driver and is formed with trunnions 20, which carry planetary pinions 21, rotatably mounted thereon and constantly in mesh with both gears 17, 18. The transmission gear train comprises a pair of draft gears, 17, 18, and a circular series of planetary pinions, 21, interposed between said gears, about the axis of the connected shafts, 15, 16. The free ends of the trunnions 20 preferably are firmly held between the meeting edges of the left 22 and right 23 parts of a rotatable housing 23'. The part 22 carries an outwardly extending annular flange 24 which has fixed thereto at 25 a ring gear 26 in mesh with the drive shaft pinion 27 on the drive shaft 28. The meeting edges of the parts 22 and 23 of the rotatable housing 23' are secured together by any desired means, or as herein shown by bolts 29.

The bevel gear type of differential employed herein for exemplication is in common use and well known in this art and therefore is not further described.

For the purpose among other things of producing a construction readily adaptable to the principal manufactures of differentials and their housings without necessity for material changes in present designs and to afford simple means which may be positioned in space not otherwise occupied in differentials, such means being capable of ultimately and sufficiently opposing relative rotative movement of the gears on the divided shaft directly or indirectly through the pinions on the spider or driver in motor vehicles to cause substantially solid rear-axle-action and yet permit ample differentiation of the road wheels, I have constructed and incorporated with a differential what is termed for the purpose herein a brake-device A mounted and preferably composed of a pair of brake-shoes 31, 32 which are constantly urged and maintained by a resilient member 33 normally in frictional relation with parts capable of relative movement. However, my invention is not limited to the use of a separate resilient member 33 as hereinafter explained in the description of a modified form B in Fig. 5. The end faces 34 of the shoes 31, 32 preferably are curvilinear and in frictional relation to the teeth 35 of the pinions 21 and the gear teeth 36 preferably have a running fit with the side walls of the brake-element A but my invention is not limited to such construction. It will be noted that at least one brake-device is mounted between the draft gears 17, 18, in the interval between two consecutive pinions of said series and between the teeth 35 of two pinions 21 and therefore by slight change in dimensions may be in frictional relation or running fit with the pinions or the gears or with both pinions and gears, as may be preferred, depending somewhat upon the degree of brake effort required, where more than one brake device is used, such brake devices are interposed in each interval between the members of said series whereby the brake devices alternate in said circle with said transmission member. The brake device is constructed and supported for reacting yieldingly against all four gears between which it is interposed and thus contracted for simultaneous brake action, or for acting simultaneously frictionally against two members of the connecting train which have movement relatively to each other when the two shaft members have relative rotation. The brake device comprises two shoes for seating against the two relatively moving members of the train and has resilient connection between the two shoes.

On reference to Fig. 5 it will be noted two separate spring steel blades 37, 38, are formed into bottom and end portions and held together by rivet 39, a portion of the outer surface of the blade 37 being adapted to be in frictional relation with the teeth of the gears 17, 18, and a portion of the outer surface of the blade 38 being adapted to be in frictional relation to the teeth of both pinions 21. In cases in which sufficient frictional resistance is afforded by one such spring blade the other one may be omitted without departing from my invention. Should only one such spring blade provide enough frictional resistance the blade may be formed into a somewhat U-shape to fit the space between said gears with the outer surface of the free ends of said brake-element bearing against portions of the opposing faces of said gears on being flexed into position where it will constantly exert pressure against the gears, as suggested in Figs. 5 and 6 to oppose relative rotative movement of the said gears, and I do not limit my invention to the employment of two such spring steel blades.

Thus is afforded a brake device interposed between the two main gears 17, 18 in the interval between the two consective planetary members 21, 21, said brake device comprising a pair of shoes which bear against the main gear 17, 18, and another pair of shoes which bear against the planetary pinions and has resilient connections between the two shoes and each pair.

In Figs. 8 and 9 appears another modified form of brake-element C, in which the ends 40 are arcuate and have a running fit with the pinions 21, the sides 41 and 42 are adapted to be forced outwardly into frictional relation with portions of the opposing faces of the gears 17, 18. Preferably the pins 43 are disposed for movement in recesses 44. The compression spring 45 is seated in recess 46, and constantly urges the outer walls 41, 42, into frictional relation with the gears 17, 18.

A single brake-element may be employed for light work but in cases of heavy duty requirement more than one brake-element may be used.

Obviously the ultimate object is to sufficiently oppose relative rotative movement of the draft gears and whether the brake-element is in frictional relation to the pinions or the gears or to both the desired result will be brought about. A greater degree of resistance is obtained by forming the brake-device to be in frictional relation with the teeth of both the pinions and with the teeth of both the draft gears. It is also apparent still greater frictional resistance results from the employment of more than one brake device.

Preferably the brake-devices are constructed and mounted in frictional relation with at least two pinions and have a running fit with the gears, but I do not limit my invention to such construction and mounting.

The modified form of the brake-element B (see Figs. 5, 6, 7) is flexed into position and the side and end portions 37, 38, exert the tension forces against the teeth of both the pinions and the gears as desired. The inwardly extending flanges 37' and 38' bear against the inner walls 22" and 23' of the housing 23" and prevent radial movement of brake-element.

Preferably ends of the brake-devices are curved to correspond with the exterior of the toothed pinions and the side surfaces of the brake-elements are parallel.

In heavy duty trucks steel die-forgings and the brake-shoes 31, 32, with the resilient member 33 and at least a plurality of brake elements are preferable. For lighter work vulcanized cotton fiber may be used particularly in the form of brake-shoes 31, 32.

I do not limit my invention to any material or form of brake-element.

In construction and operation, one or more brake devices are mounted in the interval between two consecutive pinions of said series and between and against the teeth of the draft gear and the teeth of at least two pinions and power is imparted to the rotatable housing and through it to the spider or driver, as it is termed, for backward or forward movement of self propelled vehicle. The frictional resistance constantly exerted by the brake-devices directly or indirectly in opposition to relative rotative movement of the draft gears is enough to prevent spinning of either vehicle wheel when "in the air" and not sufficient to interfere with ample differentiation to compensate for the difference in travel of the road wheels when deviating from a straight line.

Having thus fully described my invention, what I claim as new, and desire to secure by Letters-Patent, is:

1. In a differential transmission device, in combination with the shaft members between which power is transmitted, and the power-transmitting train members by which they are connected; a brake device positioned and supported for acting simultaneously frictionally against two members of the connecting train which have movement relatively to each other when the two shaft members have relative rotation.

2. In the construction defined in claim 1, the transmission gear train comprising members which are disposed in a circular series about the axis of the connected shafts, the brake device being interposed between and reacting upon two consecutive members in said series.

3. In the construction defined in claim 1, the transmission gear train comprising a series of transmitting members disposed in a circle about the axis of the connected shafts and brake devices interposed in each interval between the members of the series; whereby the brake devices alternate in the circle with said transmission members.

4. In the construction defined in claim 1, the brake device being constructed for resilient action against the members between which it is interposed.

5. In the construction defined in claim 1, the transmission train comprising a pair of differential gears and a circular series of pinions interposed between them, said brake device interposed in an interval between two pinions of the series, and adapted for bearing not only against said pinions but also against the two main gears, for brake action simultaneously upon all four of the parts thus contacted.

6. In the construction defined in claim 1 foregoing, the transmission train comprising two main gears and a circular series of pinions interposed between them, the brake device being interposed in an interval between two pinions of the series and also between the two opposing main gears, and being constructed and supported for reacting yieldingly against all four gears between which it is interposed.

7. In the construction defined in claim 1, the transmission members comprising toothed gears and the brake device being positioned and supported for seating upon the teeth of the gears.

8. In the construction defined in claim 1, the brake device comprising shoes for seating against the two relatively-moving members of the train, and resilient connections between the two shoes.

9. In the construction defined in claim 1, the train comprising two main gears and planetary pinions which connect them, the brake device being interposed between the two main gears in the interval between the two consecutive planetary gears, and comprising a pair of shoes which bear against the main gears and another pair of shoes which bear against the planetary pinions, and resilient connections between the two shoes and each pair.

In testimony whereof I affix my signature.

CLARENCE W. TAYLOR.